(No Model.)
G. LEDER.
BALE TIE.
No. 372,420. Patented Nov. 1, 1887.
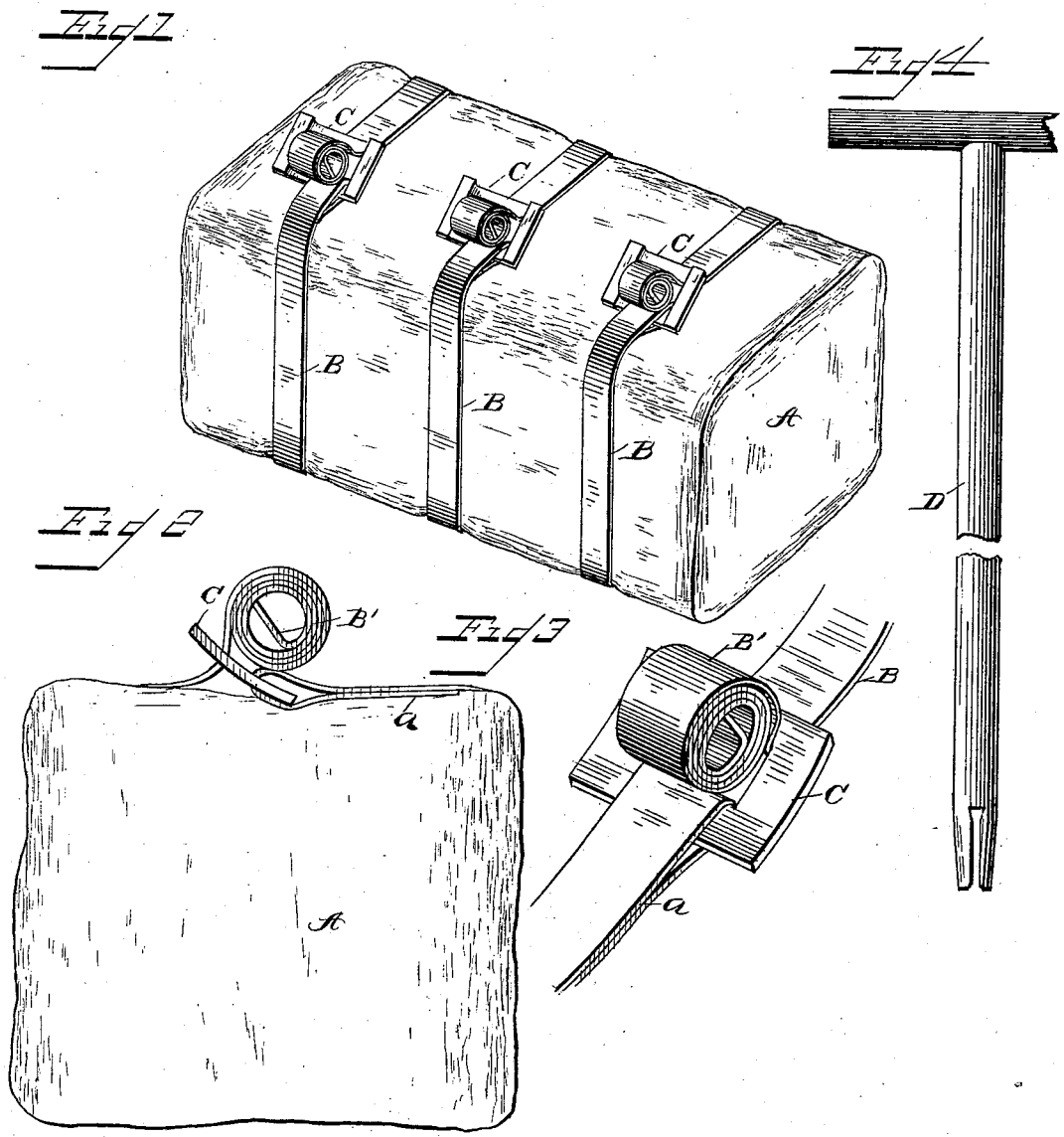
Witnesses
F. L. Ourand
G. F. Downing
Inventor
George Leder
By his Attorney
H. A. Seymour

UNITED STATES PATENT OFFICE.

GEORGE LEDER, OF DEMOPOLIS, ALABAMA.

BALE-TIE.

SPECIFICATION forming part of Letters Patent No. 372,420, dated November 1, 1887.

Application filed July 30, 1887. Serial No. 245,714. (No model.)

*To all whom it may concern:*

Be it known that I, GEORGE LEDER, of Demopolis, in the county of Marengo and State of Alabama, have invented certain new and useful Improvements in Bale-Ties; and I do hereby declare the following to be a full, clear, and exact description of the invention, such as will enable others skilled in the art to which it appertains to make and use the same.

My invention relates to cotton or other bale ties.

The object of this invention is to produce a simple and convenient bale-tie that may be rapidly affixed or tied upon a bale while the bale is in the press after the compression of the same has been effected.

A further object is to provide a bale-tie that may readily be tightened after the bale has been removed from a press, if such a tightening operation is required.

With these objects in view my invention consists in certain features of construction and combinations of parts, that will be hereinafter described, and pointed out in the claims.

Referring to the drawings, Figure 1 is a perspective view of a cotton-bale with my improved bale-ties in place on it. Fig. 2 is a side elevation of a cotton-bale, showing the manner in which the bale-tie is applied. Fig. 3 is a detached view of the bale-tie locked together. Fig. 4 is a view of the baling fork or tool by which the tying is effected.

A represents a cotton or other bale, that is to be secured by bands that are tied or fastened at their ends to hold the bale in a compressed condition.

The bands B are preferably made of strap-iron of proper width and thickness and of suitable length to be locked or tied upon a compressed bale without surplus length.

The "buckles" or square loops C are made of metal, and are of such a width as to receive the ends of the bands B when these are applied to "tie" the bale.

When a cotton-bale is placed in a "compressor" to consolidate the mass and thus render it less bulky, to facilitate handling and transportation, the bands B are placed in position beneath the uncompressed bale, with the free ends projecting at one side of the same. When the bale has been reduced to proper dimensions by action of the "press," the tying is thus effected. The buckles C are affixed to one end of the bands B by bending these ends *a*, to form loops that engage a cross-bar of each buckle, the folded ends resting between the adjacent portion of the bands B and the surface of the bale A. The free ends B' of the bands B are now inserted through the orifices in the buckles C, and are drawn up as tightly as possible either by hand or a pair pinchers. A proper gripping-fork, D, is now placed upon the ends B' of the bands B, this fork being slitted to receive the band edgewise, and is further provided with a cross-bar or handle at its opposite end to afford a means for rotation of the fork end of the tool, by which the ends B' of the bands B are coiled into a compact roll, as shown in the figures.

It will be noticed that the coiled ends B' of the bands B are wound so as to bear upon the outer surface of the opposite looped end *a* of the bands B, and thus effectually bind the loop upon the bale, at the same time the coiling of the ends B' draws the bands tightly in contact with the surface of the bale to hold it when released from the platens of the compressors.

It is evident that in case any slack should occur in the bale after it has been removed from a press, the position of the locking-coils B' will permit the fork D to be inserted in them, and the winding or coiling operation be resumed to draw the bands up more tightly.

I am aware that a bale-tie has been patented that is constructed with a band and buckle, which are secured in place upon a cotton-bale by coiling one end of the band after it has been passed through the hole in the buckle. This device is not desirable, as it is designed to coil the end of the band beneath the stretched body of the band. In other words, the coil is between the band and the bale, instead of being made upon the outer surface of the buckle, and caused to bear upon the other looped end of the band to press it toward the bale. I do not claim such a bale-tie, as it is manifestly a different form of construction from the device I illustrate and describe, and it cannot be made to operate as mine does. I disclaim such a coiled lock for a bale-tie; but, Having fully described my invention, what I claim as new, and desire to secure by Letters Patent, is—

1. A bale-tie consisting of a band and a buckle-frame, one end of the band being bent into a loop and secured to a cross-bar of the buckle-frame, the free end of this band being passed around the opposite cross-bar of the buckle-frame, and coiled spirally from its outer end to produce a rolled metal boss that has bearing contact with the outer surface of the buckle-frame, substantially as set forth.

2. A bale-tie consisting of a flat metal band and a square metal loop or buckle-frame, one end of the band being bent to hook upon a cross-bar of the buckle-frame, the other end being inserted through the hole of the buckle-frame, and coiled upon the outside of this buckle-frame so as to bear upon the opposite looped end of the band to hold it depressed and in locked engagement with the bale, substantially as set forth.

In testimony whereof I have signed this specification in the presence of two subscribing witnesses.

GEO. LEDER.

Witnesses:
WM. P. PATTON,
GEORGE F. DOWNING.